US011111710B2

(12) United States Patent  
Ulewicz et al.

(10) Patent No.: US 11,111,710 B2  
(45) Date of Patent: Sep. 7, 2021

(54) VEHICLE HAVING HINGE ASSEMBLY

(71) Applicants: James S Ulewicz, Kingston, MI (US); Wayne Reed, Rochester, MI (US)

(72) Inventors: James S Ulewicz, Kingston, MI (US); Wayne Reed, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 149 days.

(21) Appl. No.: 16/444,046

(22) Filed: Jun. 18, 2019

(65) Prior Publication Data

US 2020/0399943 A1 Dec. 24, 2020

(51) Int. Cl.
| | |
|---|---|
| *E05D 7/10* | (2006.01) |
| *B62D 33/03* | (2006.01) |
| *B62D 33/033* | (2006.01) |
| *E05D 3/02* | (2006.01) |
| *B62D 33/027* | (2006.01) |

(52) U.S. Cl.
CPC ....... *E05D 7/1072* (2013.01); *B62D 33/0273* (2013.01); *B62D 33/03* (2013.01); *B62D 33/033* (2013.01); *E05D 3/02* (2013.01); *E05Y 2900/546* (2013.01)

(58) Field of Classification Search
CPC . B60J 5/102; B60J 5/107; B60J 5/108; B62D 33/0273; B62D 33/03; B62D 33/033; E05Y 2900/544; E05Y 2900/546; E05D 3/02; E05D 7/1072
USPC .................................................. 296/57.1, 59
See application file for complete search history.

(56) References Cited

U.S. PATENT DOCUMENTS

| | | | | |
|---|---|---|---|---|
| 5,857,738 | A * | 1/1999 | Hamilton | B62D 33/0273 16/254 |
| 7,549,691 | B2 * | 6/2009 | Schulte | B62D 33/0273 296/50 |
| 10,119,313 | B2 * | 11/2018 | Higgins | E05D 11/0018 |
| 2003/0189354 | A1 * | 10/2003 | Fabiano | B62D 25/00 296/57.1 |
| 2004/0178651 | A1 * | 9/2004 | Austin | E05F 1/1238 296/57.1 |
| 2005/0200150 | A1 * | 9/2005 | Austin | B62D 33/0273 296/50 |
| 2006/0220409 | A1 * | 10/2006 | Smith | B62D 33/0273 296/57.1 |
| 2007/0096492 | A1 * | 5/2007 | Austin | B62D 33/0273 296/50 |
| 2008/0224494 | A1 * | 9/2008 | Anderson | E05F 1/1215 296/57.1 |
| 2009/0058131 | A1 * | 3/2009 | Smith | E05F 1/1223 296/146.11 |

(Continued)

*Primary Examiner* — Gregory A Blankenship
(74) *Attorney, Agent, or Firm* — Ralph E. Smith

(57) ABSTRACT

A vehicle includes a vehicle body, a tailgate and a hinge assembly. The tailgate is rotatable relative to the vehicle body between a closed position and an open position. The hinge assembly rotatably coupling the tailgate to the vehicle body. The hinge assembly includes a bracket, a hinge pin and a retention ring. The bracket is attached to a respective one of a plurality of side walls of the vehicle body. The hinge pin is rotatably fixed to a respective end of the tailgate and is removably connected to the bracket. The retention ring is rotatably coupled to the bracket between a locked state in which the hinge pin is prevented from being disconnected from the bracket and an unlocked state in which the hinge pin is permitted to be disconnected from the bracket.

19 Claims, 8 Drawing Sheets

(56) References Cited

U.S. PATENT DOCUMENTS

| | | | |
|---|---|---|---|
| 2009/0302630 A1* | 12/2009 | Duffy | E05F 1/123 296/57.1 |
| 2013/0278004 A1* | 10/2013 | Sackett | B62D 33/0273 296/57.1 |
| 2016/0222708 A1* | 8/2016 | Higgins | E05D 11/0018 |
| 2017/0274869 A1* | 9/2017 | Da Deppo | B62D 33/0273 |
| 2018/0251164 A1* | 9/2018 | Jergess | B62D 33/037 |
| 2019/0211598 A1* | 7/2019 | Hemphill | B62D 33/03 |
| 2020/0040628 A1* | 2/2020 | Trentin | E05D 7/121 |
| 2020/0047821 A1* | 2/2020 | Santana | E05D 7/1072 |
| 2020/0087962 A1* | 3/2020 | Trentin | E05D 11/1057 |
| 2020/0399943 A1* | 12/2020 | Ulewicz | E05D 7/1072 |

\* cited by examiner

VEHICLE HAVING HINGE ASSEMBLY

FIELD

The present disclosure relates to a vehicle having a hinge assembly.

BACKGROUND

This section provides background information related to the present disclosure and is not necessarily prior art.

Vehicles (e.g., pick-up trucks) include hinge assemblies for rotatably coupling a tailgate to a cargo bed. Such vehicles include a bracket that is attached to the cargo bed and covers a respective hinge assembly to prevent the tailgate from being easily removed from the cargo bed. The bracket is heavy, expensive to manufacture and time-consuming to install. The present disclosure provides a hinge assembly that prevents the tailgate from being easily removed from the cargo bed. The hinge assembly of the present disclosure is also light-weight, inexpensive to manufacture and convenient to install.

SUMMARY

This section provides a general summary of the disclosure, and is not a comprehensive disclosure of its full scope or all of its features.

In one form, the present disclosure discloses a vehicle including a vehicle body, a tailgate and a hinge assembly. The tailgate is rotatable relative to the vehicle body between a closed position and an open position. The hinge assembly rotatably coupling the tailgate to the vehicle body. The hinge assembly includes a bracket, a hinge pin and a retention ring. The bracket is attached to a respective one of a plurality of side walls of the vehicle body. The hinge pin is rotatably fixed to a respective end of the tailgate and is removably connected to the bracket. The retention ring is rotatably coupled to the bracket between a locked state in which the hinge pin is prevented from being disconnected from the bracket and an unlocked state in which the hinge pin is permitted to be disconnected from the bracket.

In some configurations of the vehicle in the above paragraph, the bracket includes a mounting portion and a hinge-pin housing. The mounting portion is attached to the respective one of the plurality of side walls and the hinge pin is disposed within the hinge-pin housing.

In some configurations of the vehicle in any one or more of the above paragraphs, a bushing is disposed within the hinge-pin housing. The hinge pin is received in a slot formed in the bushing.

In some configurations of the vehicle in any one or more of the above paragraphs, the bushing and the hinge pin rotate relative to the bracket and the retention ring when the retention ring is in the locked state and the tailgate is rotated between the open position and the closed position.

In some configurations of the vehicle in any one or more of the above paragraphs, the hinge-pin housing is positioned between the bushing and the retention ring.

In some configurations of the vehicle in any one or more of the above paragraphs, the retention ring is at least partially wrapped around the hinge-pin housing.

In some configurations of the vehicle in any one or more of the above paragraphs, the retention ring includes a body and a protrusion. The protrusion extends radially inwardly from an inner surface of the body.

In some configurations of the vehicle in any one or more of the above paragraphs, the protrusion contacts an outer surface of the hinge-pin housing when the retention ring is in the unlocked state.

In some configurations of the vehicle in any one or more of the above paragraphs, the hinge-pin housing includes a housing opening formed therein. The protrusion is disposed in the housing opening when the retention ring is in the locked state to prevent the hinge pin from being removed from the hinge-pin housing.

In some configurations of the vehicle in any one or more of the above paragraphs, the body of the retention ring defines a retention-ring opening. The hinge pin is permitted to be removed from the hinge-pin housing via the housing opening and the retention-ring opening when the retention ring is in the unlocked state and the tailgate is in the open position.

In some configurations of the vehicle in any one or more of the above paragraphs, a width of the retention-ring opening is wider than a width of the housing opening.

In some configurations of the vehicle in any one or more of the above paragraphs, the retention ring includes at least one gripping member extending radially outwardly from an outer surface of the body.

In some configurations of the vehicle in any one or more of the above paragraphs, the retention ring is made of a polymeric material.

In some configurations of the vehicle in any one or more of the above paragraphs, the retention ring is resiliently flexible.

In some configurations of the vehicle in any one or more of the above paragraphs, the retention ring is C-shaped.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
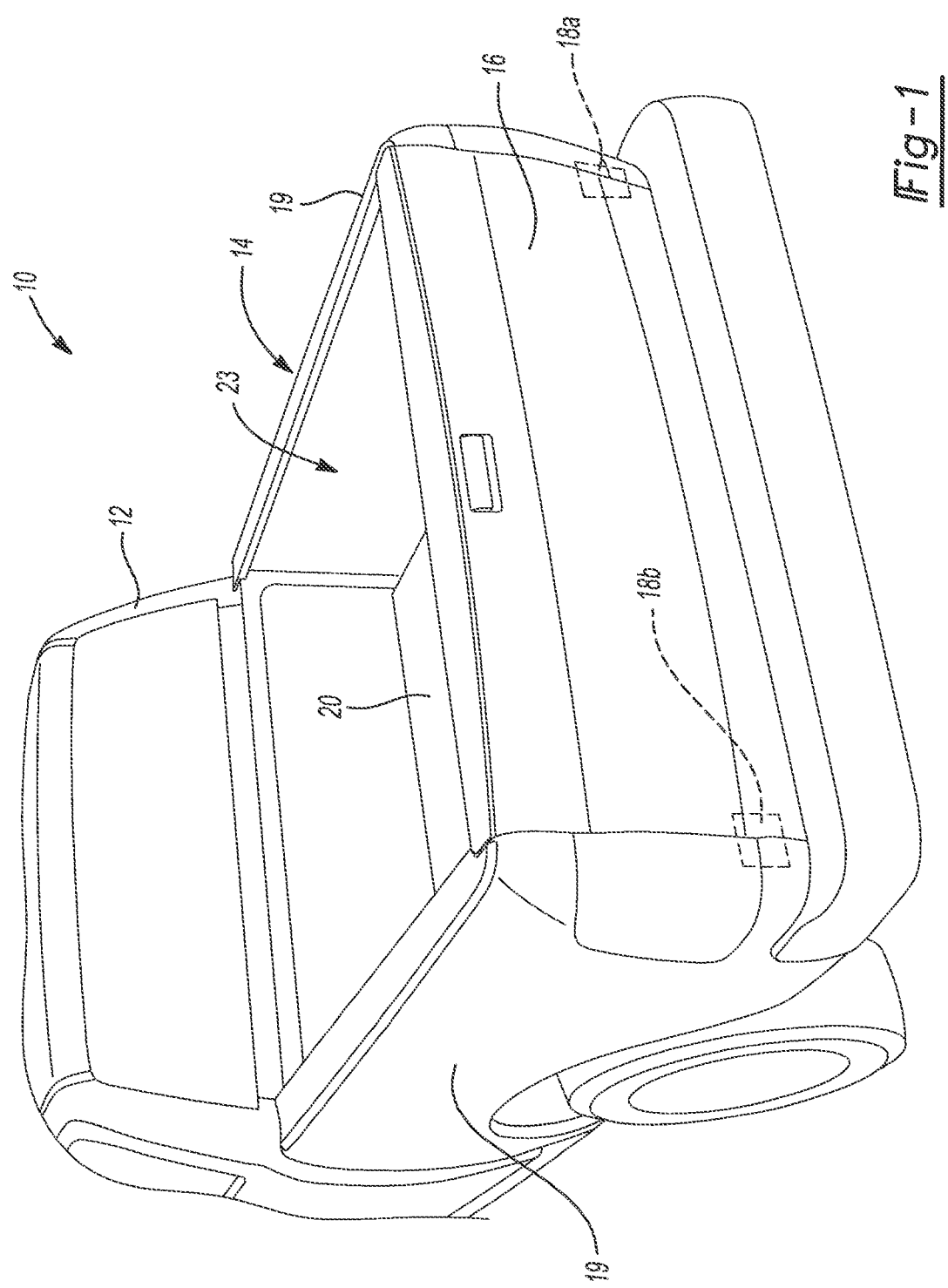
FIG. 1 is a partial perspective view of a vehicle having a tailgate and a pair of hinge assemblies according to the principles of the present disclosure.
Figure 2:
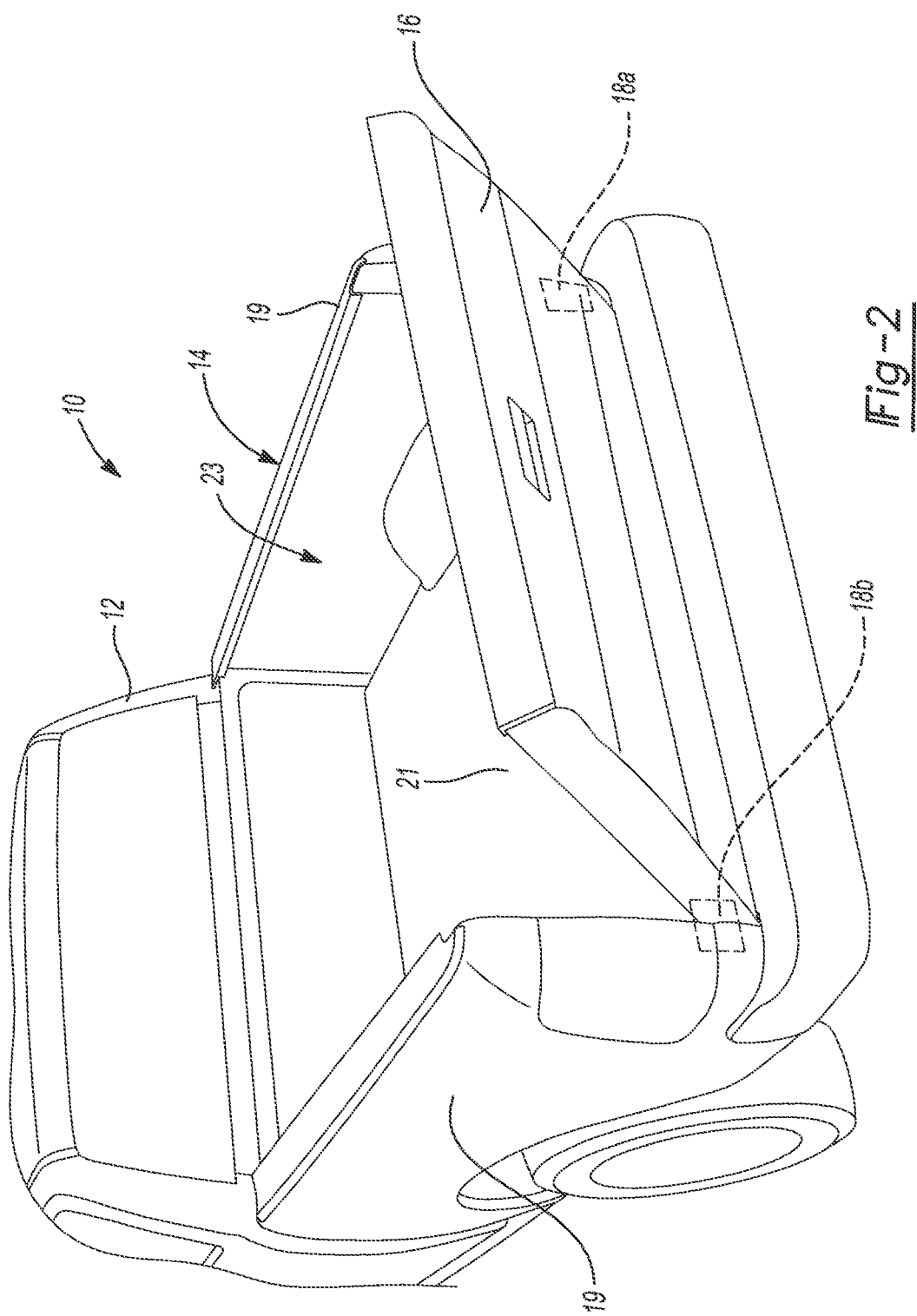
FIG. 2 is a partial perspective view of the vehicle of FIG. 1 with the tailgate in an open position.

With reference to FIGS. 1 and 2, a vehicle 10 (e.g., a pick-up truck) is provided. The vehicle 10 includes a cab 12, a cargo bed 14, a tailgate 16 and a pair of hinge assemblies 18a, 18b. The cargo bed 14 is attached to an aft end of the cab 12 and includes side walls 19 extending between fore and aft ends of the cargo bed 14. The tailgate 16 is rotatably coupled to the sidewalls 19 via the pair of hinge assemblies 18a, 18b between a closed position (FIG. 1) and an open position (FIG. 2). When the tailgate 16 is in the closed position, the tailgate 16 cooperates with the side walls 19 to define a partially enclosed cargo compartment 23 having a bottom surface 20. When the tailgate 16 is in the open position, the side walls 19 define an opening 21 to the cargo compartment 23.

Figure 3:
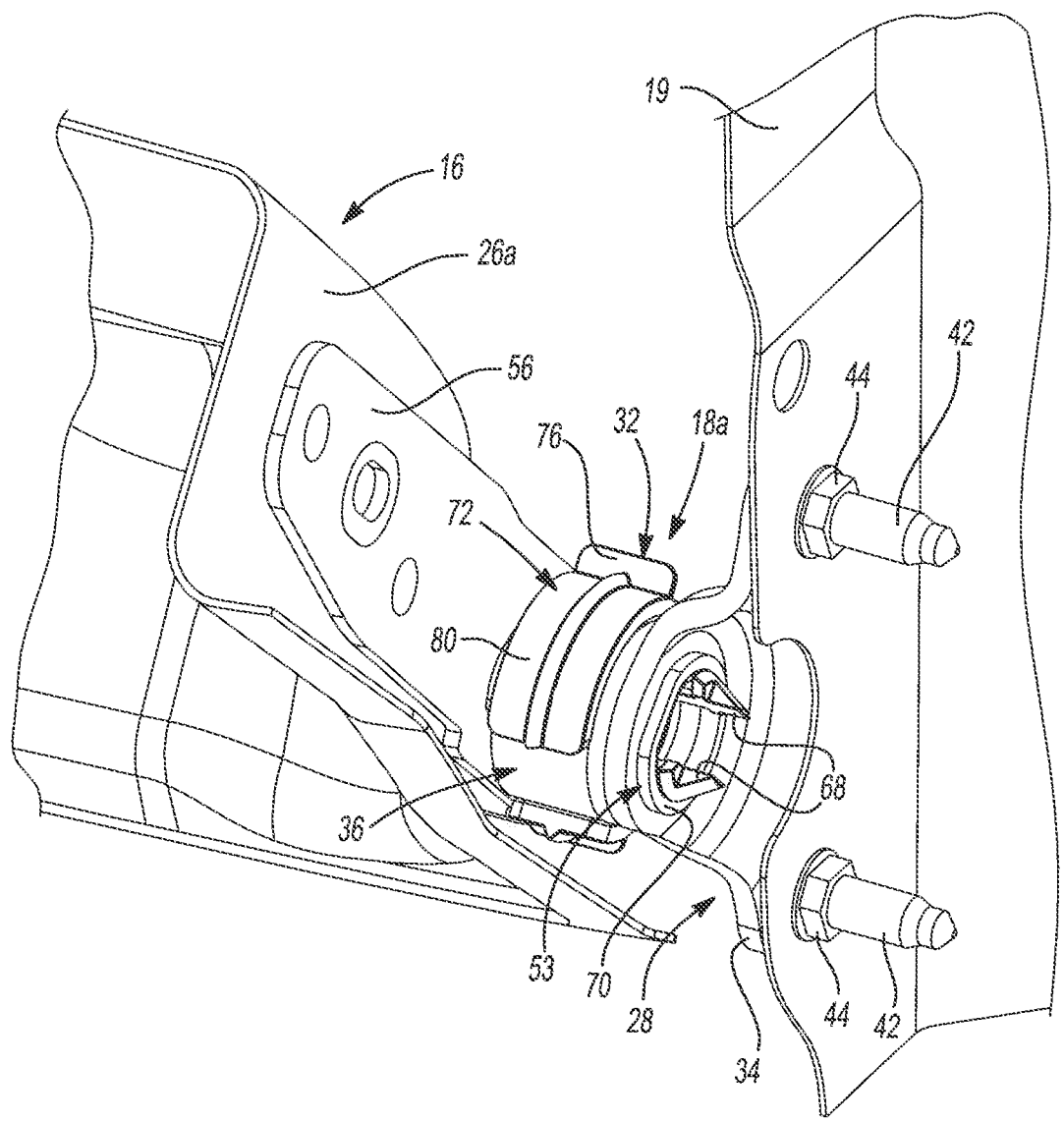
FIG. 3 is a perspective view of one hinge assembly of the pair of hinge assemblies attached to a side wall of a cargo bed and the tailgate of the vehicle.
Figure 4:
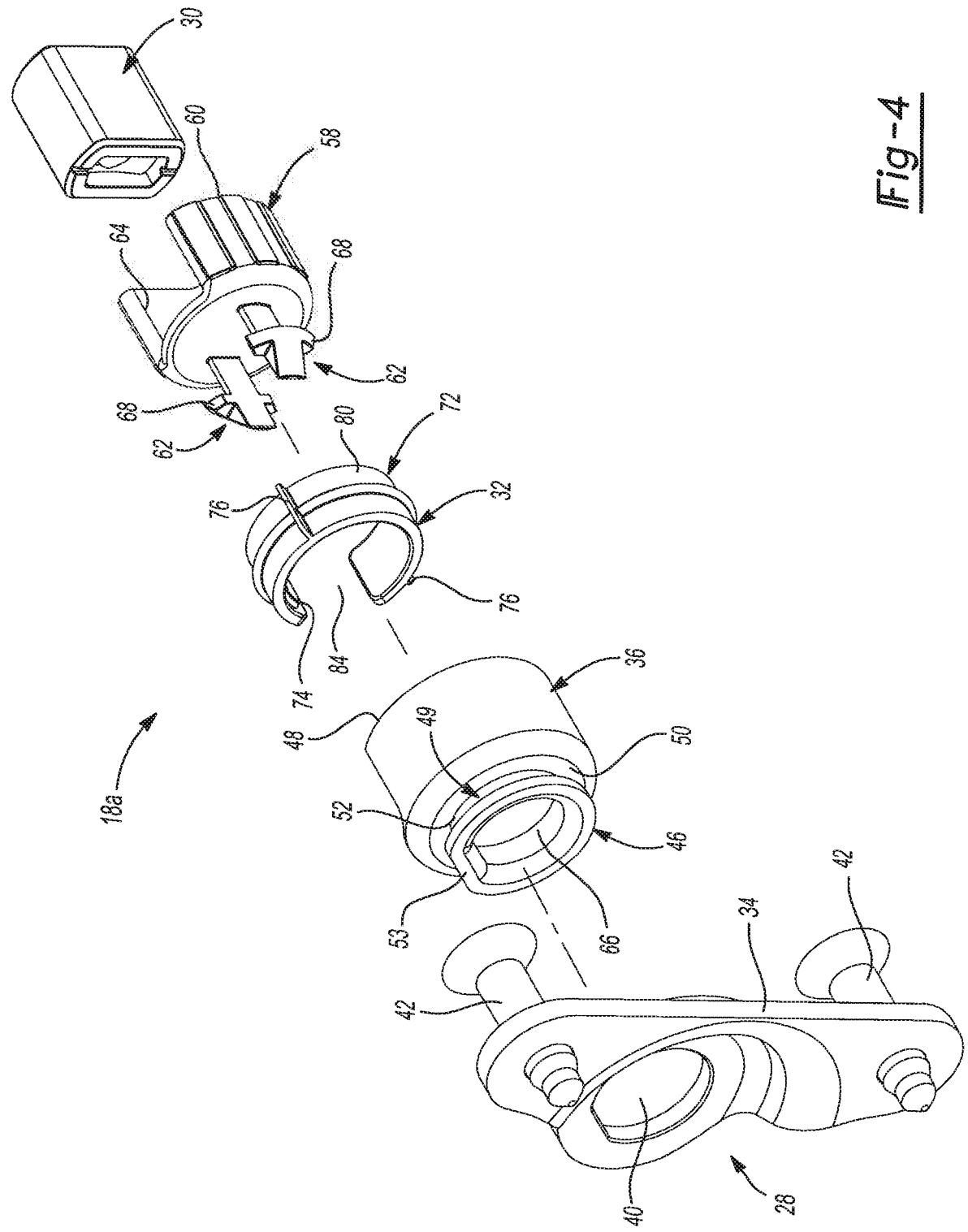
FIG. 4 is an exploded view of the one hinge assembly of the pair of hinge assemblies.

As shown in FIGS. 1 and 2, the pair of hinge assemblies 18a, 18b rotatably couple the tailgate 16 to the sidewalls 19. With reference to FIGS. 3-10, the hinge assembly 18a includes a bracket 28, a hinge pin 30 and a retention ring 32. The bracket 28 is made of a metallic material, for example, and is attached to a respective side wall 19 of the plurality of side walls 19. The bracket 28 includes a mounting portion 34 (FIGS. 3-5 and 7-10) and a cup or hinge-pin housing 36 (FIGS. 4-9). The mounting portion 34 includes a plurality of mounting apertures 38 and an opening 40. A fastener 42 may extend through a respective mounting aperture 38 and a side wall aperture (not shown) to attach the mounting portion 34 to the respective side wall 19. As shown in FIG. 3, a locking member 44 (e.g., a nut) may be secured to each fastener 42 to attach the mounting portion 34 to the respective side wall 19.

Figure 5:
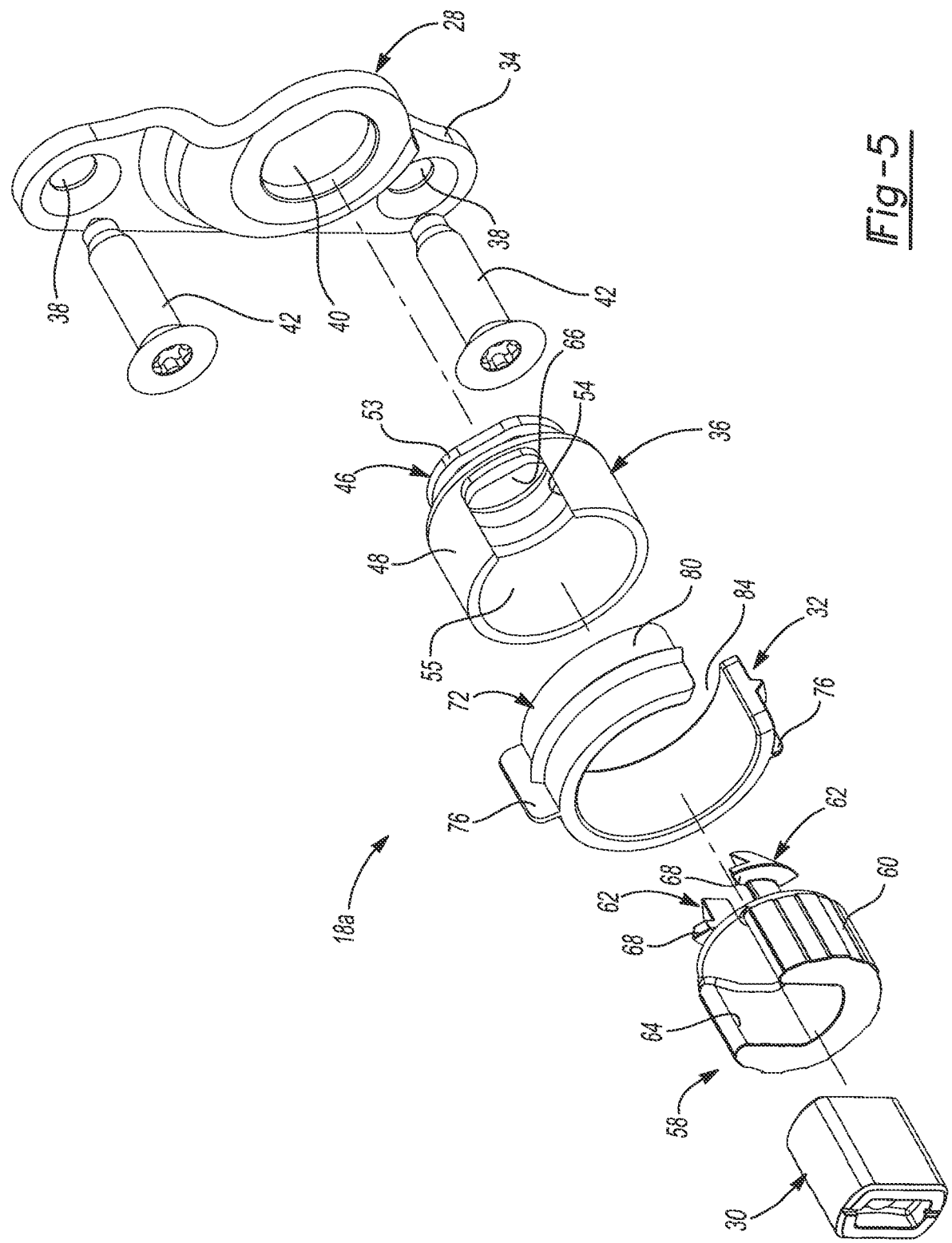
FIG. 5 is another exploded view of the one hinge assembly.

With reference to FIGS. 4-9, the cup 36 includes a base 46 (FIGS. 4-7) and a side wall 48 that extends 360 degrees around a periphery of the base 46. The base 46 may be attached to the mounting portion 34 by any suitable means. For example, the base 46 could be fixed to the mounting portion 34 by a press-fit, welding, and/or shrink-fitting. The mounting portion 34 is disposed in a groove 49 of the base 46 when the base 46 is attached to the mounting portion 34. The base 46 has a U-shaped or J-shaped cross-section and includes an inner wall 50, an intermediate wall 52 and an outer wall 53 that cooperate to define the groove 49. The inner wall 50 and the outer wall 53 extend perpendicular to the intermediate wall 52 and parallel to each other. The inner wall 50 of the base 46 and the side wall 48 cooperate to form a space 55 (FIG. 5). The side wall 48 extends 360 degrees around a periphery of the inner wall 50 and includes a U-shaped slot or opening 54 formed therein that extends from a distal end of the side wall 48 toward a proximal end of the side wall 48.

Figure 7:
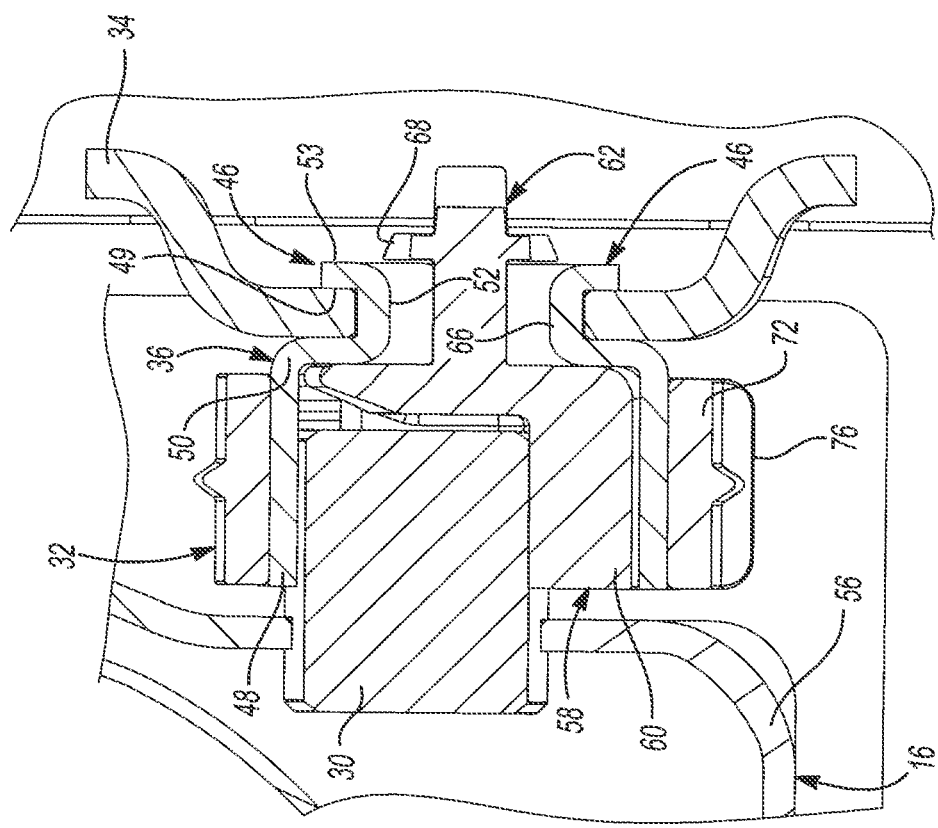
FIG. 7 is another cross-sectional view of the one hinge assembly with the retention ring in the locked state.
Figure 6:
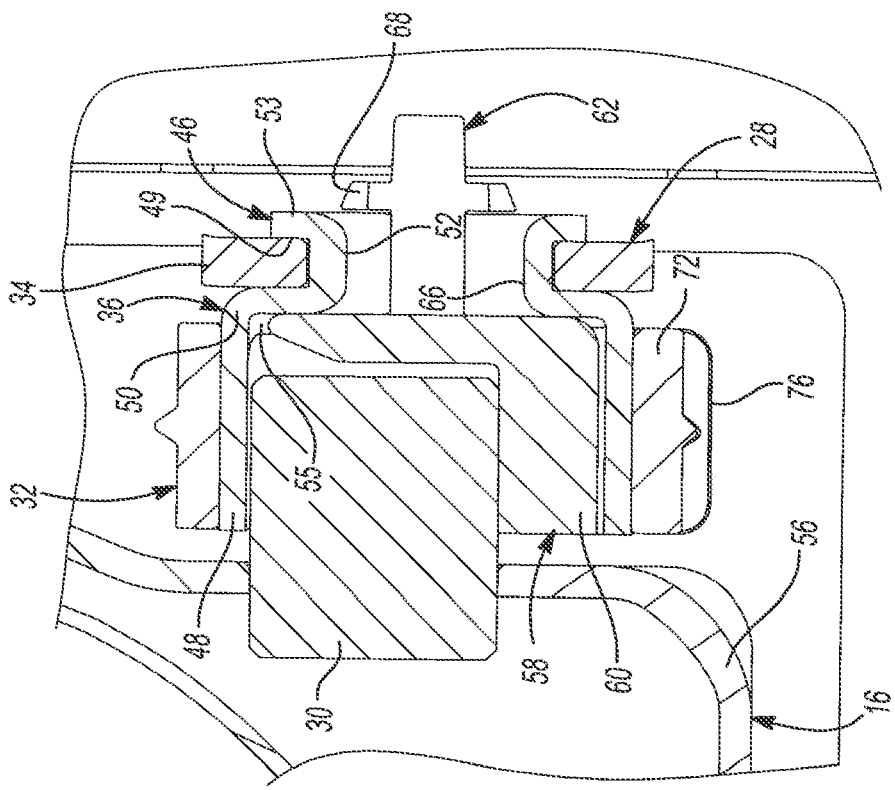
FIG. 6 is a cross-sectional view of the one hinge assembly with a retention ring of the one hinge assembly in a locked state.
Figure 9:
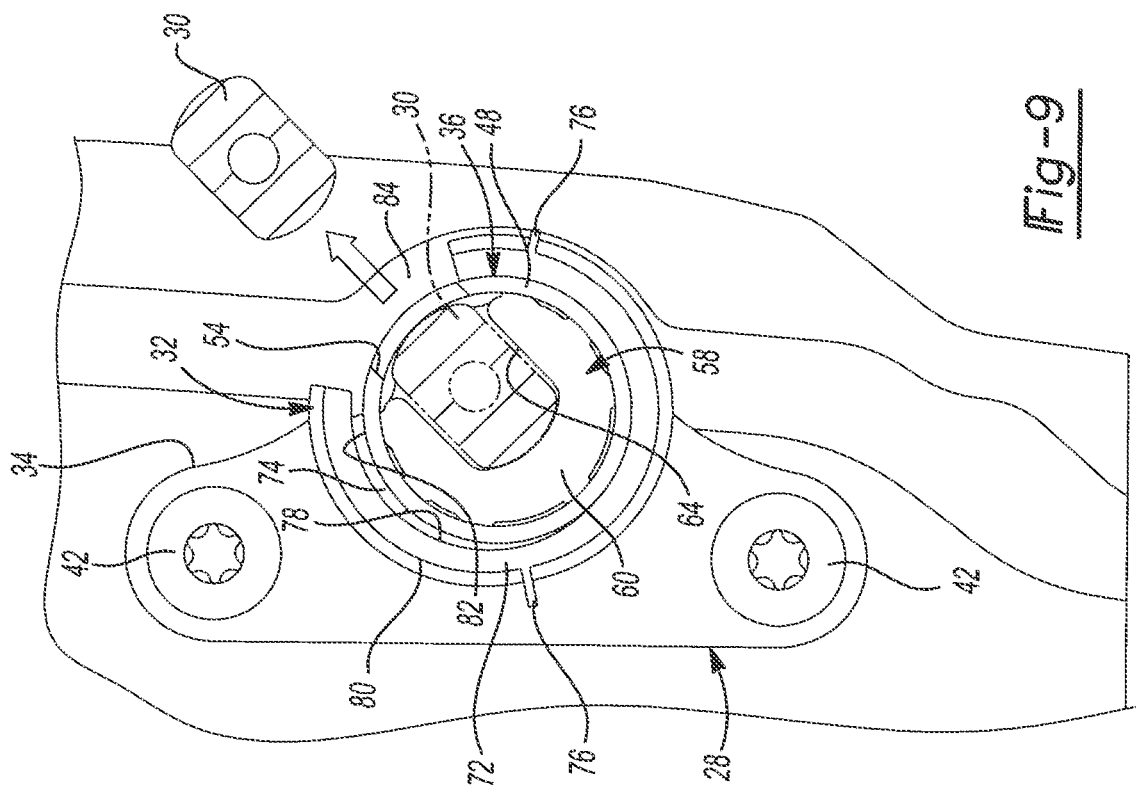
FIG. 9 is another cross-sectional view of the one hinge assembly with the retention ring in an unlocked state.
Figure 10:
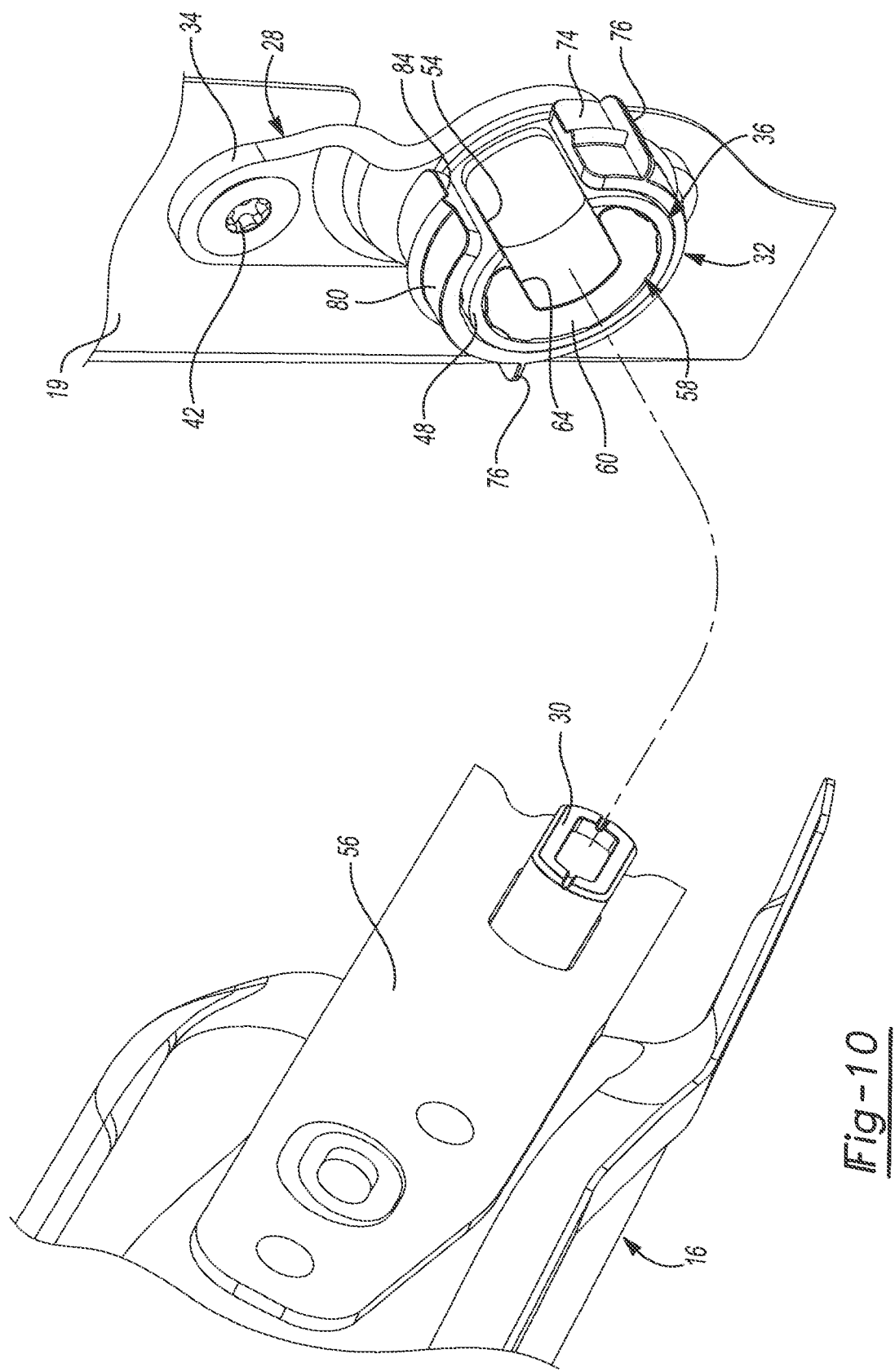
FIG. 10 is a perspective view of the one hinge assembly with the retention ring in the unlocked state and having a hinge pin being disconnected from a bracket, thereby allowing the tailgate to be removed from the cargo bed.

As shown in FIGS. 6, 7 and 10, the hinge pin 30 is attached to a bracket 56 by any suitable means. For example, the hinge pin 30 could be fixed to the bracket 56 by a press-fit, welding, and/or shrink-fitting. The bracket 56 is, in turn, rotationally fixed to side panels 26a (only one side panel shown in FIG. 3) of the tailgate 16. In this way, the hinge pin 30 is rotationally fixed to the tailgate 16. A bushing 58 is made of a polymeric material, for example, and includes a body 60 and a plurality of resiliently flexible tabs 62. The body 60 is disposed in the cup 36 (i.e., disposed in the space 55 defined by the base 46 and the side wall 48) and includes a U-shaped slot or opening 64 formed therein. The hinge pin 30 is at least partially received in the slot 64, thereby rotationally fixing the hinge pin 30 and the bushing 58.

As shown in FIGS. 4-7, the plurality of resiliently flexible tabs 62 extend outwardly from a middle portion of the body 60 and are configured to snap into engagement with the base 46 of the cup 36 when the body 60 is disposed in the cup 36. Stated another way, when the body 60 is disposed in the cup 36, the flexible tabs 62 extend through an opening 66 of the base 46 and a projection 68 of each flexible tab 62 contacts a surface 70 of the outer wall 53 of the base 46 (FIG. 3). In this way, the body 60 is retained in the cup 36. It should be understood that when the flexible tabs 62 snap into engagement with the base 46, the bushing 58 rotates relative to the cup 36.

The retention ring 32 is C-shaped, for example, and is made of a polymeric material. The retention ring 32 is resiliently flexible and is at least partially wrapped around the side wall 48 of the cup 36. The retention ring 32 is rotatably coupled to the cup 36 between a locked state (FIGS. 6-8) in which the hinge pin 30 is prevented from being removed from the cup 36 (i.e., the hinge pin 30 is prevented from being removed from the space 55 defined by the cup 36) when the tailgate 16 is in the open position, and an unlocked state (FIGS. 9 and 10) in which the hinge pin 30 is permitted to be removed from the cup 36 (i.e., the hinge pin 30 is permitted to be removed from the space 55 defined by the cup 36) when the tailgate 16 is in the open position. When the retention ring 32 is in the locked state (or the unlocked state) and the tailgate 16 is rotated between the open position and the closed position, the bushing 58 and the hinge pin 30 rotate relative to the bracket 28 and the retention ring 32. The cup 36 is positioned between the retention ring 32 and the body 60 of the bushing 58.

Figure 8:
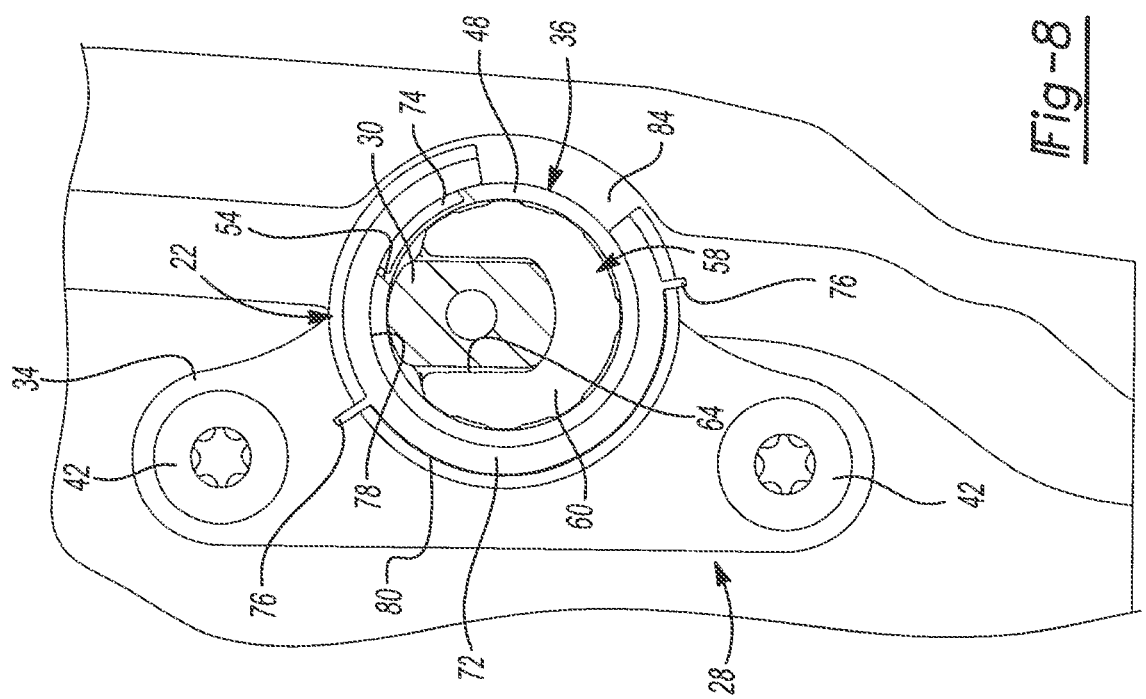
FIG. 8 is another cross-sectional view of the one hinge assembly with the retention ring in the locked state.

The retention ring 32 includes a retention-ring body 72 (FIGS. 3-10), a protrusion 74 (FIGS. 8 and 9) and a plurality of gripping members 76. The retention-ring body 72 is at least partially wrapped around the side wall 48 of the cup 36. The protrusion 74 extends radially inwardly from an inner diametrical surface 78 of the retention-ring body 72 and the plurality of gripping members 76 extend radially outwardly from an outer diametrical surface 80 of the retention-ring body 72. The protrusion 74 contacts an outer diametrical surface 82 of the side wall 48 of the cup 36 when the retention ring 32 is in the unlocked state (FIG. 9) and is disposed in the slot 54 of the side wall 48 when the retention ring 32 is in the locked state (FIG. 8). When the protrusion 74 is disposed in the slot 54 of the side wall 48 and the tailgate 16 is in the open position, the hinge pin 30 is prevented from being removed from the cup 36.

As shown in FIGS. 4, 5, 8-10, the retention-ring body 72 of the retention ring 32 also defines an opening 84. When the tailgate 16 is in the open position and the retention ring 32 is in the unlocked state, the openings 64, 54, 84 of the body 60, the sidewall 48 and the retention-ring body 72, respectively, can be aligned (FIG. 9), which permits the hinge pin 30 to be removed from the opening 64 (via the openings 54, 84). In this way, the tailgate 16 is able to be removed from the side walls 19, thereby allowing a technician (not shown), for example, to service the vehicle 10.

With continued reference to FIGS. 1-10, operation of the hinge assemblies 18a, 18b will be described in detail. A user (not shown) can have the tailgate 16 in the closed position while operating the vehicle 10. If the tailgate 16 needs to be removed for service, for example, a service technician is able to rotate the tailgate 16 to the open position and manually or with a tool (not shown) rotate the retention ring 32 from the locked state to the unlocked state. When the tailgate 16 is in the open position and the retention ring 32 is in the unlocked state, the service technician can remove the tailgate 16 from the cargo bed 14. That is, when the tailgate 16 is in the open position and the retention ring 32 is in the unlocked state, the service technician aligns the openings 64, 54, 84 of the body 60, the sidewall 48 and the retention-ring body 72, respectively, and removes the hinge pin 30 from the opening 64 (via the openings 54, 84). After the hinge pin 30 is removed from the opening 64, the service technician may slide the tailgate 16 to the right to disconnect a hinge pin (not shown) of the hinge assembly 18b that is attached to the tailgate 16 from a bracket (not shown) of the hinge assembly 18b that is attached to a corresponding sidewall 19 of the cargo bed 14.

One benefit of the hinge assembly 18a of the present disclosure is that the retention ring 32 prevents a vehicle operator from easily removing the tailgate 16 from the vehicle 10 while still allowing the tailgate 16 to be removed from the vehicle 10 for servicing by a service technician, for example. Another benefit of the hinge assembly 18a of the present disclosure is that the retention ring 32 is light weight, inexpensive and easy to install during assembly of the vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a vehicle body;
   a tailgate rotatable relative to the vehicle body between a closed position and an open position; and
   a hinge assembly rotatably coupling the tailgate to the vehicle body, the hinge assembly including a bracket, a hinge pin and a resiliently flexible retention ring, the bracket attached to a respective one of a plurality of side walls of the vehicle body, the hinge pin rotatably fixed to a respective end of the tailgate and removably connected to the bracket, the retention ring rotatably coupled to the bracket between a locked state in which the hinge pin is prevented from being disconnected from the bracket and an unlocked state in which the hinge pin is permitted to be disconnected from the bracket.

2. The vehicle of claim 1, wherein the bracket includes a mounting portion and a hinge-pin housing, and wherein the mounting portion is attached to the respective one of the plurality of side walls and the hinge pin is disposed within the hinge-pin housing.

3. The vehicle of claim 2, further comprising a bushing disposed within the hinge-pin housing, and wherein the hinge pin is received in a slot formed in the bushing.

4. The vehicle of claim 3, wherein the bushing and the hinge pin rotate relative to the bracket and the retention ring when the retention ring is in the locked state and the tailgate is rotated between the open position and the closed position.

5. The vehicle of claim 4, wherein the hinge-pin housing is positioned between the bushing and the retention ring.

6. The vehicle of claim 2, wherein the retention ring is at least partially wrapped around the hinge-pin housing.

7. The vehicle of claim 6, wherein the retention ring includes a body and a protrusion, and wherein the protrusion extends radially inwardly from an inner surface of the body.

8. The vehicle of claim 7, wherein the protrusion contacts an outer surface of the hinge-pin housing when the retention ring is in the unlocked state.

9. The vehicle of claim 8, wherein the hinge-pin housing includes a housing opening formed therein, and wherein the protrusion is disposed in the housing opening when the retention ring is in the locked state to prevent the hinge pin from being removed from the hinge-pin housing.

10. The vehicle of claim 9, wherein the body of the retention ring defines a retention-ring opening, and wherein the hinge pin is permitted to be removed from the hinge-pin housing via the housing opening and the retention-ring opening when the retention ring is in the unlocked state and the tailgate is in the open position.

11. The vehicle of claim 10, wherein a width of the retention-ring opening is wider than a width of the housing opening.

12. The vehicle of claim 10, wherein the retention ring includes at least one gripping member extending radially outwardly from an outer surface of the body.

13. The vehicle of claim 1, wherein the retention ring is made of a polymeric material.

14. The vehicle of claim 1, wherein the retention ring is C-shaped.

15. A vehicle comprising:
    a vehicle body;
    a tailgate rotatable relative to the vehicle body between a closed position and an open position; and
    a hinge assembly rotatably coupling the tailgate to the vehicle body, the hinge assembly including a bracket having a hinge pin housing extending outward from the bracket, a bushing coupled to the hinge pin housing, a hinge pin, and a retention ring,
    wherein the bracket is attached to a respective one of a plurality of side walls of the vehicle body, the hinge pin is rotatably fixed to a respective end of the tailgate and removably connected to the hinge pin housing via the bushing, and the retention ring is rotatably coupled to the hinge pin housing between a locked state in which the hinge pin is prevented from being disconnected from the bracket and an unlocked state in which the hinge pin is permitted to be disconnected from the bracket,
    wherein the bushing includes a flexible tab that extends through the hinge pin housing toward the bracket that couples the bushing to the hinge pin housing, and
    wherein the bushing and the hinge pin rotate relative to the hinge pin housing and the retention ring when the retention ring is in the locked state and the tailgate is rotated between the open position and the closed position.

16. The vehicle of claim 15, wherein the retention ring is resiliently flexible.

17. A hinge assembly configured to rotatably couple a tailgate to a vehicle body including a plurality of sidewalls, the hinge assembly comprising a bracket, a hinge pin and a resiliently flexible retention ring, the bracket being configured to be attached to a respective one of the plurality of side walls of the vehicle body, the hinge pin is configured to be rotatably fixed to a respective end of the tailgate and removably connected to the bracket, and the retention ring rotatably is coupled to the bracket between a locked state in which the hinge pin is prevented from being disconnected from the bracket and an unlocked state in which the hinge pin is permitted to be disconnected from the bracket.

18. The hinge assemble according to claim 17, wherein the bracket includes a mounting portion and a hinge-pin housing; and the mounting portion is attached to the respective one of the plurality of side walls and the hinge pin is disposed within the hinge-pin housing.

19. The hinge assembly according to claim 18, further comprising a bushing disposed within the hinge-pin housing, wherein the hinge pin is received in a slot formed in the bushing, and the bushing and the hinge pin rotate relative to the bracket and the retention ring when the retention ring is in the locked state and the tailgate is rotated between the open position and the closed position.

\* \* \* \* \*